(12) United States Patent
Asao

(10) Patent No.: US 8,395,061 B2
(45) Date of Patent: Mar. 12, 2013

(54) ELECTRICAL JUNCTION BOX

(75) Inventor: Takahiro Asao, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 352 days.

(21) Appl. No.: 12/888,847

(22) Filed: Sep. 23, 2010

(65) Prior Publication Data

US 2011/0094793 A1  Apr. 28, 2011

(30) Foreign Application Priority Data

Oct. 28, 2009  (JP) .................................. 2009-248268

(51) Int. Cl.
*H01L 23/48* (2006.01)
(52) U.S. Cl. .......................... 174/549; 174/50; 439/76.2
(58) Field of Classification Search ................ 439/76.2; 174/18, 549, 50
See application file for complete search history.

(56) References Cited

U.S. PATENT DOCUMENTS

| 5,882,213 | A  | * | 3/1999  | Witek et al. .................. 439/76.2 |
| 6,322,376 | B1 | * | 11/2001 | Jetton ........................... 439/76.2 |
| 6,679,708 | B1 | * | 1/2004  | Depp et al. ................... 439/76.2 |
| 6,822,163 | B2 | * | 11/2004 | Saneto et al. .................... 174/50 |
| 7,361,841 | B1 | * | 4/2008  | Smolen et al. ............. 174/138 F |
| 7,494,348 | B1 | * | 2/2009  | Tyler et al. ....................... 439/79 |
| 7,499,262 | B1 | * | 3/2009  | Darr ............................ 361/626 |
| 7,785,116 | B2 | * | 8/2010  | Akahori et al. ............. 439/76.2 |
| 7,893,364 | B2 | * | 2/2011  | Oda ............................ 174/520 |
| 7,914,300 | B2 | * | 3/2011  | Akahori et al. ............. 439/76.2 |

FOREIGN PATENT DOCUMENTS

| JP | A-2002-330527 | 11/2002 |
| JP | A-2002-345126 | 11/2002 |
| JP | A-2004-134278 | 4/2004  |
| JP | A-2007-060758 | 3/2007  |
| JP | A-2008-123928 | 5/2008  |
| JP | A-2008-283777 | 11/2008 |

\* cited by examiner

*Primary Examiner* — Hung Ngo
(74) *Attorney, Agent, or Firm* — Oliff & Berridge, PLC.

(57) ABSTRACT

A new electrical junction box in which even if a plurality of bolts are connected to external electrical cables, an external electrical power supply cable from a jump starter can be surely connected to a target connecting bolt, thereby avoiding a problem of an error in coupling by a simple structure. A coupling error check wall is provided around an alternator connecting bolt. An alligator clip for jump starting is prevented to be connected to the alternator connecting bolt. The alligator clip for jump starting is permitted to be connected to a battery connecting bolt.

2 Claims, 2 Drawing Sheets

ELECTRICAL JUNCTION BOX

BACKGROUND

This invention relates to an electrical junction box to be mounted on a motor vehicle, and more particularly relates to an electrical junction box provided with connecting bolts to which electrical power supply terminals are coupled.

Heretofore, an electrical junction box such as a fuse box, to which electrical power supply terminals from a battery are connected, is installed in an engine room in a motor vehicle to obtain good maintenance of electrical power supply paths in the motor vehicle and to efficiently branch an electrical power source.

When a battery becomes a superdischarged condition in a motor vehicle, the electrical junction box provided with a relief hardware structure has been proposed so that the battery under the superdischarged condition receives electrical power supply from a battery in another motor vehicle or an emergency potable electrical power source (hereinafter referred to "a jump starter") to start an engine. Such a relief terminal hardware structure has been disclosed in, for example, JP 2004-134278 A and JP 2008-123928 A. In particular, in a current hybrid type motor vehicle or the like, since it is difficult to install an upsized battery in an engine room, the battery can be disposed in a trunk room or the like different from the engine room. In this case, if an electrical junction box provided with the relief terminal hardware structure is installed in the engine room, it will be possible to deal with the discharged battery merely by opening a hood of the engine room. Accordingly, such electrical junction box has been available.

However, in the above electrical junction box, a relief terminal must be specially made of a bus bar, and in addition, a distinguishable cover member that protects the relief terminal must be provided in the electrical junction box in order to prevent an error in coupling. Accordingly, this will increase the number of parts and will involve complicated steps in production.

It may be considered that an external electrical power supply cable is connected to a connecting bolt, to which a feeder from a battery is connected, to receive an electrical power supply from the jump starter in the electrical junction box. However, the electrical junction box such as a fuse box that receives the electrical power supply from the battery is provided with a plurality of connecting bolts such as a starter connecting bolt to which a feeder to a starter is connected, and an alternator connecting bolt to which a feeder from an alternator is connected, as well as a battery connecting bolt to which a feeder from a battery is connected. Accordingly, there is a possibility that an external electrical power supply cable from the jump starter may be connected to another connecting bolt by mistake. Particularly, if the external electrical power supply cable from the jump starter is connected to the alternator bolt connected to a feeder from the alternator, a load is applied to the alternator and its function will be lowered.

The exemplary embodiments of the invention address the above problems and other problems by, for example, providing a new electrical junction box in which even if a plurality of bolts are connected to external electrical cables, an external electrical power supply cable from a jump starter can be surely connected to a target connecting bolt, thereby avoiding a problem of an error in coupling by a simple structure.

In an exemplary embodiment an electrical junction box includes: a battery connecting bolt to which a feeder from a battery is connected, and an alternator connecting bolt to which a feeder to an alternator is connected. A coupling error check wall is provided around the alternator connecting bolt to restrain a space around the alternator connecting bolt. A feeder terminal to an alternator and a fixing nut are permitted to be mounted on the alternator connecting bolt and an alligator clip for jump starter is prevented to be connected to the alternator connecting bolt. A space around the battery connecting bolt is set to be larger than the space around the alternator connecting bolt to permit the alligator clip for jump starter to be connected to the battery connecting bolt.

When the battery reaches a superdischarged condition, an external electrical power supply cable (an alligator clip for jump starter) is connected to the battery connecting bolt to which a battery terminal is attached so as to supply an electrical power to the superdischarged battery in the electrical junction box installed in the engine room. Accordingly, it is possible to supply an external electrical power to the superdischarged battery merely by connecting the alligator clip for jump starter to the conventional battery connecting bolt without providing any special relief terminal for the superdischarged battery.

In addition, since the coupling error check wall is provided on the space around the alternator connecting bolt, it is possible to prevent the alligator clip for jump starter from being connected to the alternator connecting bolt by mistake and to avoid a lower performance of the alternator based on excessive load to the alternator upon an error in coupling. It is preferable that the coupling error check wall is provided on each of opposite sides of the alternator connecting bolt. It is more preferable that the coupling error check wall is provided to surround three sides of the alternator connecting bolt.

Particularly, because the coupling error check wall is provided on the space around the alternator connecting bolt so that the feeder is permitted to be connected to the alternator connection bolt and the alligator clip for jump starter is prevented from being connected to the alternator connecting bolt, it is possible to easily connect the feeder terminal to the alternator and to completely prevent the alligator clip for jump starter from being connected to the alternator connecting bolt.

In an exemplary embodiment, the coupling error check wall protrudes over an end of the alternator connecting Thus, it is possible to prevent the protruding end of a shaft portion of the alternator connecting bolt from protruding outward (upward) from a protruding end of the coupling error check wall.

Because the coupling error check wall is provided around the alternator connecting bolt, it is possible to positively connect the external electrical power supply cable from the jump starter to the target battery connecting bolt, thereby avoiding the error in coupling.

DETAILED DESCRIPTION OF EMBODIMENTS

Figure 1:
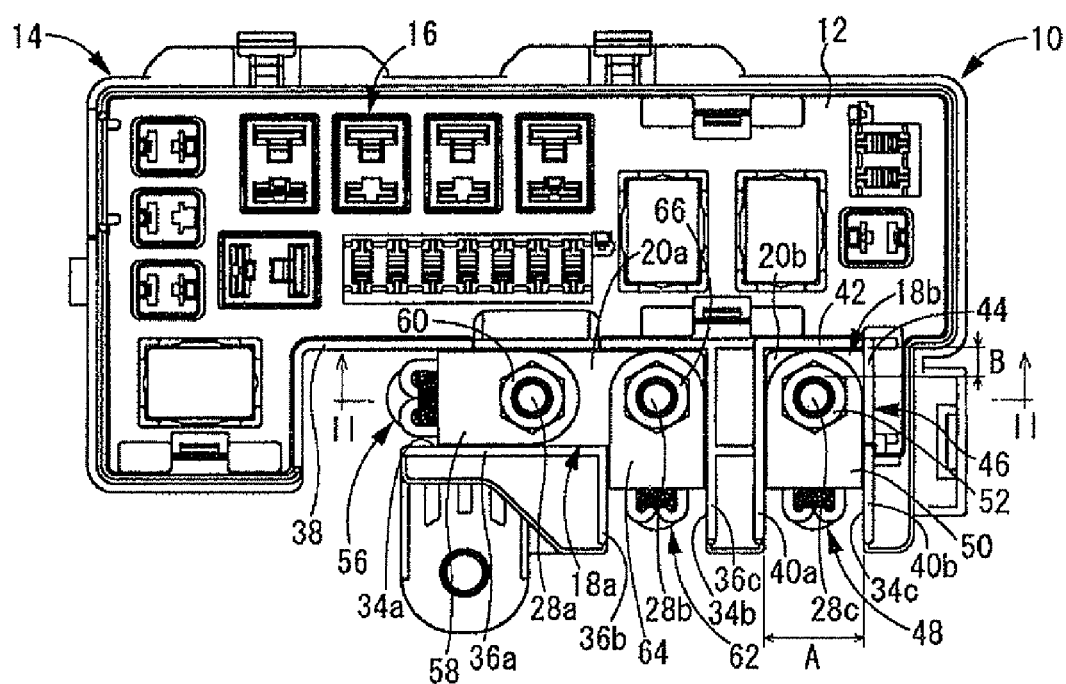
FIG. 1 is a plan view of an embodiment of an electrical junction box in accordance with the exemplary embodiments illustrating the electrical junction box from which an upper cover is removed.

Referring now to the drawings, embodiments of an electrical junction box in accordance with the present invention will be described below.

Figure 2:
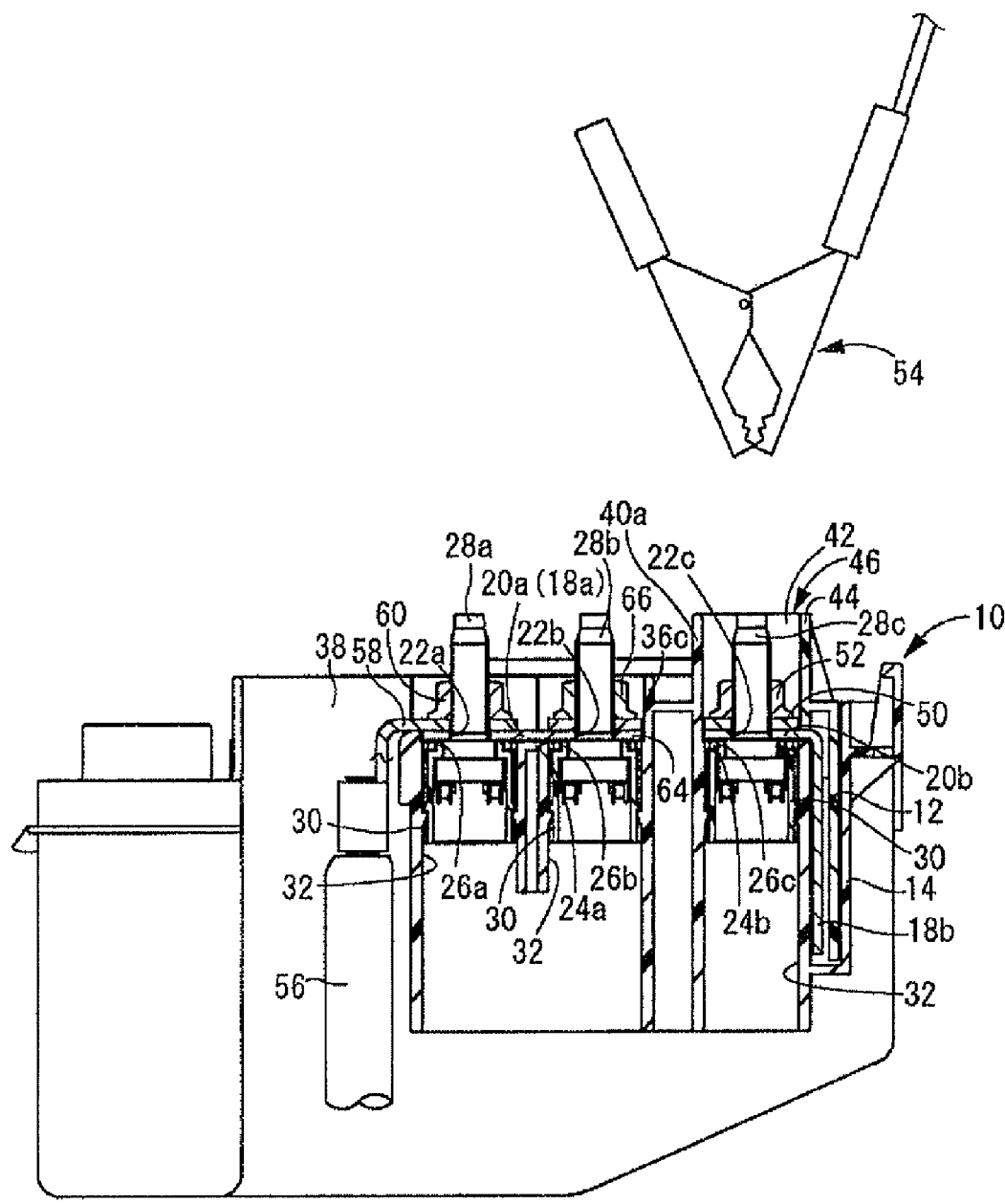
FIG. 2 is a section view taken along lines II-II in FIG. 1.

FIGS. 1 and 2 show an embodiment of an electrical junction box 10. The electrical junction box 10 includes an electrical junction box main body 12, an upper cover (not shown) to be incorporated in the main body 12 from an upper side, and a lower cover 14 to be incorporated in the main body 12 from a lower side. The electrical junction box 10 is attached through a bracket (not shown) to an engine room in a motor vehicle. Hereinafter, a vertical direction designates upper and lower directions in FIG. 2 in principle.

Specifically, the electrical junction box main body 12 is provided with a fuse mounting section 16, on which fuses (not shown) are mounted, and is formed into a rectangular block-like configuration, as a whole. Bus bars 18 that constitute internal circuits connected to the fuses are installed in the electrical junction box main body 12.

The bus bars 18 are provided with terminal sections 20a and 20b that are exposed outward so that the terminal sections 20a and 20b protrude outward from the electrical junction box main body 12 with the bus bars 18 being installed in the main body 12. The terminal section 20a is provided with two bolt through-holes 22a and 22b while the terminal section 20b is provided with a single bolt through-hole 22c.

On the other hand, the lower cover 14 is formed into a box-like configuration that is open upward. The lower cover 14 is provided on an outer periphery with two bolt receiving sections 24a and 24b. The bolt receiving sections 24a and 24b are formed into substantially rectangular flat plate-like configurations and extend in a direction perpendicular to a height direction of the lower cover 14.

The one bolt receiving section 24a is provided with two bolt receiving apertures 26a and 26b. A battery connecting bolt 28a and a starter connecting bolt 28b are inserted into the bolt receiving apertures 26a and 26b from a lower side of the bolt receiving section 24a, respectively.

The other bolt receiving section 24b is provided with a single bolt receiving aperture 26c. An alternator connecting bolt 28c is inserted into the bolt receiving aperture 26c from a lower side of the bolt receiving section 24b.

The connecting bolts 28a to 28c are inserted into the bolt receiving apertures 26a to 26c with bolt covers 30 attached to heads of the bolts 28a to 28c, which are prevented from being disconnected from bolt containing apertures 32 provided on lower parts of the bolt receiving sections 24a and 24b. Under this condition, the connecting bolts 28a to 28c protrude from upper surfaces of the bolt receiving sections 24a and 24b so that the bolts 28a to 28c can slightly move in a vertical direction.

The one bolt receiving section 24a is provided near the battery connecting bolt 28a with a battery cut-out portion 34a whose one end edge portion in a width direction is cut out. Also, the one bolt receiving section 24a is provided near the starter connecting bolt 28b with a starter cut-out portion 34b whose extending end side edge portion is cut out.

The one bolt receiving section 24a is provided with a vertical wall 36a that extends along an end edge of the battery cut-out portion 34a. The vertical wall 36a extend in parallel with a peripheral wall 38 of the lower cover 14 and is coupled to a vertical wall 36b that extends along one edge of the starter cut-out portion 34b. A vertical wall 36c that extends along the other edge of the starter cut-out portion 34b extend in parallel with the vertical wall 36b and is coupled to the peripheral wall 38 of the lower cover 14. Protruding end surfaces of the vertical walls 36a to 36c are disposed at the same level in height as a protruding end surface of the peripheral wall 38 of the lower cover 14 and shaft portions of the battery connecting bolt 28a and starter connecting bolt 28b protrude upward by a large amount.

The other bolt receiving section 24b is provided near the alternator connecting bolt 28c with an alternator cut-out portion 34c whose protruding side end edge portion is cut out.

The other bolt receiving section 24b is also provided with a vertical wall 40a that extends along one edge of the alternator cut-out portion 34c, and with a vertical wall 40b that extends along the other edge of the alternator cut-out portion 34c and along the vertical wall 40a. The vertical wall 40a is coupled to the peripheral wall 38 of the lower cover 14, but the vertical wall 40b is not coupled to the peripheral wall 38 of the lower cover 14. A clearance having a size sufficient to receive a fitting wall 44, discussed below, is defined between the vertical wall 40b and the peripheral wall 38 of the lower cover 14.

Protruding end surfaces of the vertical walls 40a and 40b are disposed at the same level in height as a protruding end surface of the alternator connection bolt 28c. The lower cover 14 is integrally provided on the peripheral wall 38 with a protruding wall 42 that protrudes upward and extends in a direction perpendicular to extending directions of the vertical walls 40a and 40b. The protruding wall 42 is coupled to the vertical wall 40a and a protruding end surface of the wall 42 is disposed at the same level in height as the vertical walls 40a and 40b. A dimension of the protruding wall 42 in a width direction (in right and left directions in FIG. 1) is set to be slightly larger than a distance between the vertical walls 40a and 40b.

The lower cover 14 constructed above is incorporated in the electrical junction box main body 12 from the lower side. Under this condition, the terminal sections 20a and 20b of the bus bars 18 are superimposed on upper surfaces of the bolt receiving sections 24a and 24b, and three connecting bolts 28a to 28c are inserted into three bolt through-holes 22a to 22c, respectively.

The fitting wall 44 (mentioned above) provided on the electrical junction box main body 12 is fitted into the clearance between the vertical wall 40b and the peripheral wall 38 of the lower cover 14. A protruding end surface of the fitting wall 44 is disposed at the same level in height as protruding end surfaces of the vertical walls 40a and 40b and protruding wall 42. Thus, the vertical walls 40a, protruding wall 42, fitting wall 44, and vertical wall 40b form a substantially U-shaped configuration in cross section around the alternator connecting bolt 28c to surround the bolts 28c at three sides. The U-shaped configuration defines a coupling error check wall 46 having the same level in height as that of alternator connecting bolt 28c.

The coupling error check wall 46 is open at a side of the alternator cut-out portion 34c to surround the alternator connecting bolt 28c at three sides. Thus, when the feeder 48 to an alternator is disposed in the alternator cut-out portion 34c, an electrical power supply terminal 50 provided on an end of the feeder 48 is mounted on the alternator connecting bolt 28c. When a fixing nut 52 is screwed on and fastened to the alternator connecting bolt 28c, the feeder 48 to the alternator is connected to the alternator connecting bolt 28c.

Because a clearance between the alternator connecting bolt 28c and the coupling error check wall 46 is set to be a suitable size, it is possible to prevent an alligator clip 54 for jump starter from being connected to the alternator connecting bolt 28c. Specifically, by suitably adjusting a distance A between opposed surfaces of the vertical wall 40a and the fitting wall 44 in accordance with sizes of an electrical power supply terminal 50 and alternator connecting bolts 28c, the alligator clip 54 for jump starter cannot enter the clearance between the opposed surfaces of the vertical wall 40a and the fitting wall 44, when the alligator clip 54 for jump starter is opened so that it can clamp the alternator connecting bolt 28c. As a result, it is possible to prevent the alligator clip 54 for jump starter from being connected to the alternator connecting bolt 28c so that the alligator clip 54 for jump starter clamps the alternator connecting bolt 28c in the opposed direction of the vertical wall 40a and fitting wall 44.

By suitably adjusting a clearance B between an outer periphery of the alternator connecting bolt 28c and the protruding wall 42 in a direction of a perpendicular extending down from a center of the alternator connecting bolt 28c to the protruding wall 42, it is possible to prevent the alligator clip 54 for jump starter from being connected to the alternator connecting bolt 28c so that the alligator clip 54 for jump starter clamps the alternator connecting bolt 28c in the extruding direction of the vertical wall 40a and fitting wall 44. The protruding wall 42 may protrude upward over a distal end of the alternator connecting bolt 28c.

A connecting terminal 58 is provided on an end of the feeder 56 connected to the battery and contained in the battery cut-out portion 34a. After the connecting terminal 58 is mounted on the battery connecting bolt 28a, a fixing nut 60 is screwed on and fastened to the battery connecting bolt 28a. Thus, the feeder 56 from the battery is connected to the battery connecting bolt 28a.

The battery connecting bolt 28a protrudes over the protruding end surfaces of the vertical wall 36a and peripheral wall 38. Thus, a space around the battery connecting bolt 28a is set to be larger than a space around the alternator connecting bolt 28c. This permits the alligator clip 54 for jump starter to be connected to the battery connecting bolt 28a.

A connecting terminal 64 is provided on an end of the feeder 62 connected to the starter and contained in the starter cut-out portion 34b. After the connecting terminal 64 is mounted on the starter connecting bolt 28b, a fixing nut 66 is screwed on and fastened to the starter connecting bolt 28b. Thus, the feeder 62 to the starter is connected to the starter connecting bolt 28b. The alligator clip 54 for jump starter can be connected to the starter connecting bolt 28b that protrudes over the protruding end surfaces of the vertical wall 36c and peripheral wall 38.

In the electrical junction box 10 described above, the alligator clip 54 for jump starter is prevented from being connected to the alternator connecting bolt 28c, but the clip 54 is permitted to be connected to the battery connecting bolt 28a. As a result, it is possible to surely connect the alligator clip 54 for jump starter to the battery connecting bolt 28a.

Particularly, because the battery connecting bolt 28a and alternator connecting bolt 28c are plus (+) side terminal sections, they are disposed together at one place in order to enhance prevention of a short circuit due to contact with another member and to enhance efficiency of current conductive circuits in the electrical junction box 10, in many cases. In this case, there may be a high risk that the alligator clip 54 for jump starter is coupled to the alternator connecting terminal 28c by mistake. Accordingly, the coupling error check wall 46 exerts its function effectively, thereby preventing the alligator clip 54 for jump starter from being coupled to the alternator connecting terminal 28c.

Because the protruding end surface of the coupling error check wall 46 is disposed at the substantially same level in height as that of the alternator connecting bolt 28c, it is possible to effectively prevent the alligator clip 54 for jump starter from being coupled to the alternator connecting terminal 28c.

In addition, because the coupling error check wall 46 is formed by walls (vertical walls 40a and 40b, protruding wall 42, and fitting wall 44) integrated with the lower cover 14 and electrical junction box main body 12, there is no increase in number of parts and it is possible to decrease the number of steps in production and lower the cost of production.

Although exemplary embodiments of the present invention are described above, it should be noted that the present invention is not limited to the above embodiments. For example, only the vertical wall 40a and fitting wall 44 may constitute the coupling error check wall in the above embodiment.

The protruding end surface of the coupling error check wall 46 may project over the protruding end surface of the alternator connecting bolt 28c.

What is claimed is:

1. An electrical junction box comprising:
    a battery connecting bolt to which a wire from a battery is connected;
    an alternator connecting bolt to which a wire from an alternator is connected;
    a coupling error check wall disposed around the alternator connecting bolt to restrain a space around the alternator connecting bolt;
    a terminal connected to the wire from the alternator and a fixing nut being mountable on the alternator connecting bolt; and
    a clip for jump starting, wherein the clip is prevented from being connected to the alternator connecting bolt by the coupling error check wall, and
    the electrical junction box defines a space around the battery connecting bolt larger than a space around the alternator connecting bolt so as to permit the alligator clip to be connected to the battery connecting bolt.

2. An electrical junction box according to claim 1, wherein the coupling error check wall protrudes at a same height or higher than a top of the alternator connecting bolt.

* * * * *